May 23, 1950     J. L. DYKE     2,509,085
AUTOMATIC VALVE
Filed Aug. 11, 1948
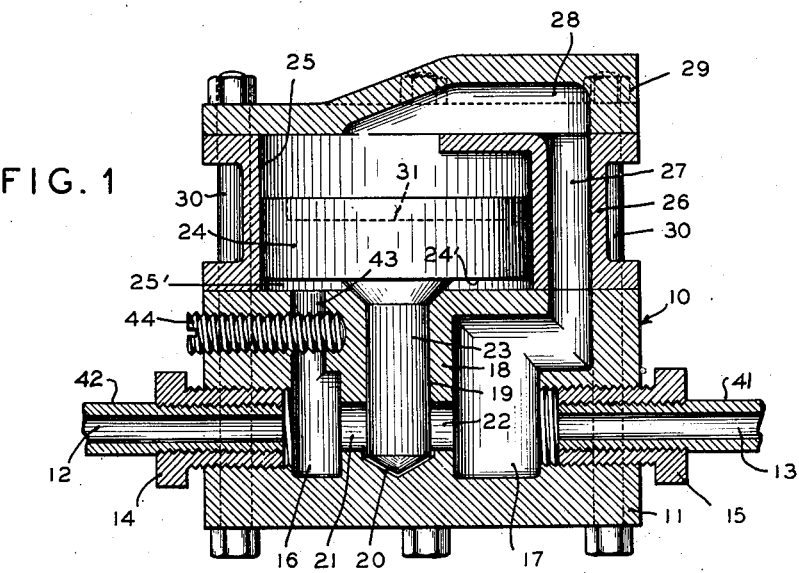
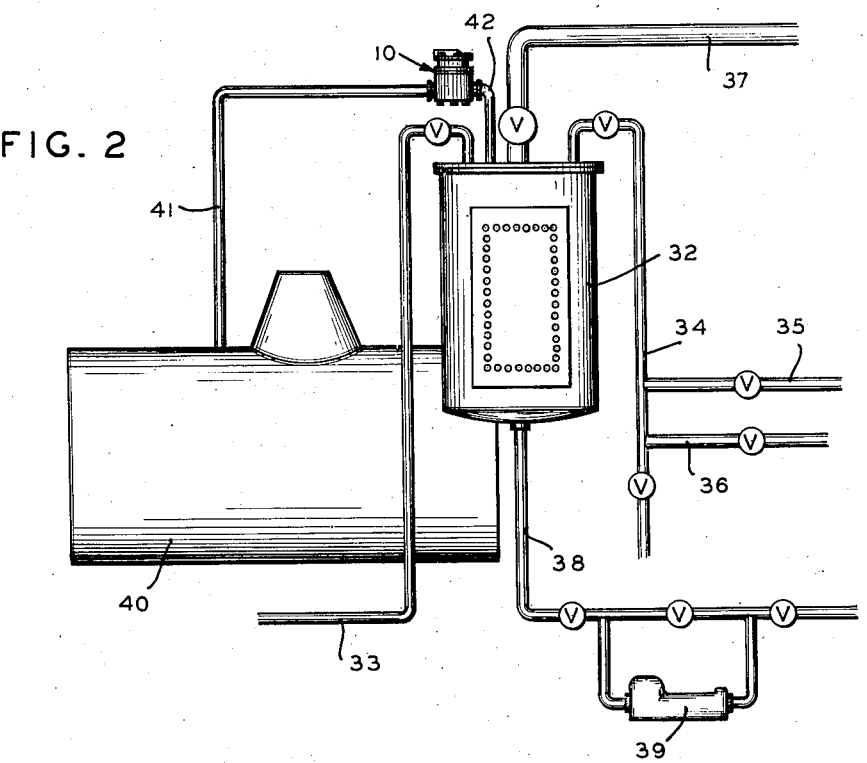
INVENTOR.
J. L. DYKE
BY
ATTORNEY Patented May 23, 1950

2,509,085

UNITED STATES PATENT OFFICE 2,509,085

AUTOMATIC VALVE

Joseph Leroy Dyke, Norfolk, Va.

Application August 11, 1948, Serial No. 43,589

8 Claims. (Cl. 137—153)

This invention relates to fluid control devices and more particularly to a valve automatically operable as a result of a predetermined differential pressure on two sides of the valve.

It is well recognized that many automatic valves operating as a result of a differential pressure have heretofore been developed but many of these are large and cumbersome and are not sufficiently sensitive to perform the operation intended.

It is therefore an object of this invention to provide a relatively small, lightweight, inexpensively constructed automatic valve which may be utilized in a variety of systems where it is desired to have a valve operable by a differential pressure.

It is a further object of this invention to provide an automatic valve which may also be manually controlled in order to operate the same under certain conditions.

It is a still further object of this invention to provide an automatic valve constructed of a plurality of individual castings or the like which are easily machinable and which may be assembled to form the complete valve by relatively unskilled labor, thus materially reducing the cost of manufacture.

Further objects and advantages of the invention will be apparent from the following description taken in conjunction with the accompanying drawings, wherein:

Fig. 1 is an elevational view in section showing the internal construction of the valve forming this invention; and Fig. 2, a diagrammatic showing of a typical feed water heating system incorporating the valve of this invention.

With continued reference to the drawing, there is shown in Fig. 1 a valve 10 having a main body portion 11 provided with an inlet 12 and an outlet 13. Inlet 12 may be provided with a threaded nipple 14 and outlet 13 may be provided with a threaded nipple 15 to facilitate attachment of conduits or pipes thereto. It is, of course, obvious that other conventional pipe fittings or the like may be substituted for these nipples.

The body 11 is provided internally thereof with an inlet chamber 16 and an outlet chamber 17. These chambers are separated by a dividing wall or partition 18, which is provided with cylindrical bore 19 terminating at the bottom thereof in a conical seat 20. The partition 18 is also provided with lateral apertures 21 and 22 which communicate with the chambers 16 and 17 respectively.

Slidably disposed within the cylindrical bore 19 is a valve 23 having at its lower end a conical surface complementary to and adapted to seat on the conical seat 20 in the body 11. Secured to the upper end of valve 23 is a piston 24, the dimensions of which are calculated to provide the desired weight which will result in opening or closing of the valve 23 upon the attainment of a predetermined differential pressure between the inlet 12 and the outlet 13.

Piston 24 is slidably disposed in a cylinder 25 formed in a second section 26 of the valve body. Section 26 is also provided with a passage 27 communicating with outlet chamber 17 and through a passage 28 formed in cap 29 with cylinder 25. The cap 29, section 26, and main valve body 11 may be assembled and securely held together by through bolts 30 or other equivalent fastening means.

In order to provide flexibility in the operation of the valve or in other words, to permit operation with different differential pressures, the piston 24 may be provided on its upper surface with a recess 31 within which may be disposed additional weights in order to vary the operational characteristics of the valve.

One application of the valve forming this invention is shown in Fig. 2, in which 32 is a conventional feed water heater provided with the usual coils and having a fed water inlet pipe 33, an outlet pipe 34 communicating with a main feed pipe 35 and an auxiliary feed pipe 36. Steam for heating the feed water circulating through the coils is provided through pipe 37 and the condensate resulting from heating the water is drawn off through pipe 38 and condensate trap 39. A condenser 40 which usually receives the exhaust steam from an engine or turbine in such an installation is provided and connected to this condenser is a pipe 41 leading to the outlet 13 of the valve 10 of this invention, the inlet 12 of the valve being connected through pipe 42 with the upper portion of the feed water heater 32.

In operation of a system of this sort, water vapor collects in the upper portion of the feed water heater and materially reduces the heating efficiency thereof, this efficiency decreasing in proportion to the amount of vapor present therein. In order to maintain the efficiency of the heater as near maximum as possible, it is desirable to withdraw or vent the vapor from the upper portion of the feed water heater and the valve of this invention automatically accomplishes this result. As is common in such installations the interior of the condenser 40 is subjected to a relatively high vacuum and through pipe 41, this vacuum is applied to chamber 17 and the cylinder 25 of the valve 10. It will be noted from an inspection of Fig. 1 that the lower surface 24' of the piston 24 occupies a position appreciably spaced from the bottom surface of the cylinder 25 thus providing a space 25' between these surfaces when the piston 24 is in lowermost position and the valve 23 seated on conical seat 20.

Assuming the valve to be in closed position, pressure equal to the vapor pressure in the feed water heater will be applied through inlet 12 to the chamber 16 and through aperture 21 to the valve 23. As stated above a vacuum is applied to the upper portion of cylinder 25 above the piston 24 which results in an unequal pressure above and below the piston, the fluid necessarily present in the space 25' exerting an upward force on the piston 24 which when great enough to overcome the weight of the piston 24 and valve 23 will cause the valve to move upwardly opening the same and permitting passage of vapor from aperture 21 through aperture 22 to chamber 17. This opening of the valve will also result in an upward force being applied to the lower end of the valve 23 thus further assisting in upward movement and a wider opening of the same. The vapor flowing into chamber 17 through the valve will pass through outlet 13 and pipe 41 to the condenser 40. The fluid in space 25' will be at atmospheric pressure or above depending upon whether or not there is any leakage by the valve 23 into this space. Ordinarily there would be some slight leakage from chamber 16 by the valve which would keep space 25' filled with fluid.

It will thus be seen that this flow of vapor will have the effect of reducing the vacuum present in the chamber 17 and cylinder 25 and consequently when the pressure differential between the top of the piston and the underside thereof is reduced sufficiently the valve will close thereby shutting off flow of vapor from chamber 16 to chamber 17 and permitting the vacuum in chamber 17 and cylinder 25 to again build up. By properly calculating the weight of piston 24 and valve 23 the automatic action of the valve will result in substantially all of the vapor present in the upper portion of the feed water heater 32 being removed therefrom thus maintaining substantially maximum efficiency thereof.

The above described system is included by way of illustration only, since obviously the valve of this invention may find application in numerous other systems.

In view of the fact that instances may arise in which it is desired to immediately open the valve without depending on the automatic operation thereof, there is provided in the body 11 a passage 43 communicating with the chamber 16 and the lower portion of the cylinder 25 beneath the piston 24. Passage 43 is normally closed by a screw threaded plug or the like 44 although obviously this closure might well take the form of a conventional plug type valve. Should it be desirable or necessary to open the valve 23 without depending on the automatic operation thereof, it is only necessary to open the passage 43 by partial removal of the plug 44 at which time pressure present in the chamber 16 will be applied to the relatively large surface area of the bottom of piston 24 resulting in the immediate upward movement thereof and opening of the valve 23, permitting passage of fluid through apertures 21 and 22 to the outlet 13.

It will therefore be seen that by this invention there has been provided a relatively simple inexpensive and yet highly dependable and efficient automatic valve for use in installations where a differential pressure is present and where automatic operation of a valve as a result of this differential pressure is desired.

It will be obvious to those skilled in the art that various changes may be made in the invention without departing from the spirit and scope thereof and therefore the invention is not limited by that which is shown in the drawings and described in the specification but only as indicated in the appended claims.

What is claimed is:

1. In a fluid distribution system, a pressure chamber, a vacuum chamber, and automatic valve means connecting said chambers whereby fluid from said pressure chamber may be transferred to said vacuum chamber upon attainment of a predetermined differential pressure between the two, said valve means comprising a first body member having an inlet and an outlet, an inlet chamber communicating with said inlet, and an outlet chamber communicating with said outlet, a partition between said chambers having a cylindrical vertical bore, the lower end of which is provided with a valve seat, apertures in said partition communicating with said bore and with said inlet and outlet chambers, a valve slidably disposed in said bore and seating on said seat when in closed position, a second body member disposed in coaxial relation to said first body member and being provided with a cylinder, a piston of appreciable weight attached to the upper end of said valve and being slidably disposed in said cylinder, a passage communicating with said outlet chamber and the upper portion of said cylinder, a cap disposed on the upper end of said second body member and serving to close the upper end of said cylinder, the weight of said piston and said valve being so proportioned that said valve will move upwardly and open upon the attainment of said predetermined differential pressure, a passage communicating with said inlet chamber and the lower portion of said cylinder beneath said piston and closure means for said passage whereby upon removal of said closure means pressure will be applied directly to the underside of said piston resulting in the opening of said valve.

2. In a fluid distribution system a pressure chamber, a vacuum chamber and automatic valve means connecting said chambers whereby fluid from said pressure chamber may pass to said vacuum chamber upon attainment of a predetermined differential pressure between said chambers, said valve comprising a first body member having an inlet and an outlet, an inlet chamber communicating with said inlet and an outlet chamber communicating with said outlet, a partition between said chambers having a cylindrical vertical bore the lower end of which is provided with a valve seat, apertures in said partition communicating with said bore and with said inlet and outlet chambers, a valve slidably disposed in said bore and seating on said seat when in closed position, a second body member disposed in coaxial relation to said first body member and being provided with a cylinder, a piston of appreciable weight attached to the upper end of said valve and being slidably disposed in said cylinder, a passage communicating with said outlet chamber and the upper portion of said cylinder, a cap disposed on the upper end of said second body member and serving to close the upper end of said cylinder, the weight of said piston and said valve being so proportioned that said valve will move upwardly and open upon the attainment of said predetermined differential pressure between the upper portion of said cylinder and said inlet chamber.

3. An automatic valve comprising a first body member having an inlet and an outlet, an inlet chamber communicating with said inlet and an outlet chamber communicating with said outlet, a partition between said chambers having a cylindrical vertical bore the lower end of which is provided with a valve seat, apertures in said partition communicating with said bore and with said inlet and outlet chambers, a valve slidably disposed in said bore and seating on said seat when in closed position, a second body member disposed in coaxial relation to said first body member and being provided with a cylinder, a piston of appreciable weight attached to the upper end of said valve and being slidably disposed in said cylinder a passage communicating with said outlet chamber and the upper portion of said cylinder, a cap disposed on the upper end of said body member and serving to close the upper end of said cylinder, the weight of said piston and said valve being so proportioned that said valve will move upwardly and open upon the attainment of a predetermined differential pressure between the upper portion of said cylinder and said inlet chamber, a passage communicating with said inlet chamber and the lower portion of said cylinder below said piston and closure means for said passage whereby upon removal of said closure means pressure will be applied directly to the lower surface of said piston resulting in upward movement thereof and opening of said valve.

4. An automatic valve comprising a body having an inlet and an outlet, an inlet chamber communicating with said inlet and an outlet chamber communicating with said outlet, a partition between said chambers having a cylindrical bore the end of which is provided with a valve seat, apertures in said partition communicating with said bore and with said inlet and outlet chambers, a valve slidably disposed in said bore and seating on said seat when in closed position, a cylinder in said body, a piston of appreciable weight attached to the upper end of said valve and being slidably disposed in said cylinder, a passage communicating with said outlet chamber and the upper portion of said cylinder, the weight of said piston and said valve being so proportioned that said valve will move upwardly and open upon the attainment of a predetermined differential pressure between the upper portion of said cylinder and said inlet chamber, a passage communicating with said inlet chamber and the lower portion of said cylinder below said piston and closure means for said passage whereby upon removal of said closure means pressure will be applied directly to the lower surface of said piston resulting in upward movement thereof and opening of said valve.

5. An automatic valve comprising a first body member having an inlet and an outlet, an inlet chamber communicating with said inlet and an outlet chamber communicating with said outlet, a partition between said chambers having a cylindrical vertical bore the lower end of which is provided with a valve seat, apertures in said partition communicating with said bore and with said inlet and outlet chambers, a valve slidably disposed in said bore and seating on said seat when in closed position, a second body member disposed in coaxial relation to said first body member and being provided with a cylinder, a piston of appreciable weight attached to the upper end of said valve and being slidably disposed in said cylinder, a passage communicating with said outlet chamber and the upper portion of said cylinder, a cap disposed on the upper end of said second body member and serving to close the upper end of said cylinder, the weight of said piston and said valve being so proportioned that said valve will move upwardly and open upon the attainment of a predetermined differential pressure between the upper portion of said cylinder and said inlet chamber.

6. An automatic valve comprising a body having an inlet and an outlet, an inlet chamber communicating with said inlet and an outlet chamber communicating with said outlet, a partition between said chambers having a cylindrical vertical bore the lower end of which is provided with a valve seat, apertures in said partition communicating with said bore and with said inlet and outlet chambers, a valve slidably disposed in said bore and seating on said seat when in closed position, a cylinder in said body, a piston of appreciable weight attached to the upper end of said valve and being slidably disposed in said cylinder, a passage communicating with said outlet chamber and the upper portion of said cylinder, the weight of said piston and said valve being so proportioned that said valve will move upwardly and open upon the attainment of a predetermined differential pressure between the upper portion of said cylinder and said inlet chamber.

7. An automatic valve comprising a body having an inlet and an outlet, an inlet chamber communicating with said inlet and an outlet chamber communicating with said outlet, a partition between said chambers having a bore therein the end of which is provided with a valve seat, apertures in said partition communicating with said bore and with said inlet and outlet chambers, a valve slidably disposed in said bore and seating on said seat when in closed position, a cylinder in said body, a piston attached to the upper end of said valve and being slidably disposed in said cylinder, a passage communicating with said outlet chamber and the upper portion of said cylinder, the weight of said piston and said valve being so proportioned that said valve will move upwardly and open upon the attainment of a predetermined differential pressure between the upper portion of said cylinder and said inlet chamber.

8. An automatic valve comprising a body having an inlet and an outlet, an inlet chamber communicating with said inlet and an outlet chamber communicating with said outlet, a partition between said chambers provided with a bore and a valve seat, apertures in said partition communicating with said bore and with said inlet and outlet chambers, a valve slidably disposed in said bore and seating on said seat when in closed position, a cylinder in said body, a piston attached to said valve and being slidably disposed in said cylinder, means communicating with said outlet chamber and with the upper portion of said cylinder whereby upon the attainment of a predetermined differential pressure between the upper portion of said cylinder and said inlet chamber said piston will move upwardly to open said valve.

JOSEPH LEROY DYKE.

REFERENCES CITED

The following references are of record in the file of this patent:

UNITED STATES PATENTS

| Number | Name | Date |
|---|---|---|
| 1,987,666 | Carlson | Jan. 15, 1935 |
| 2,025,626 | Wheeler | Dec. 24, 1935 |
| 2,173,416 | Horstman | Sept. 19, 1939 |